United States Patent [19]

Huffman

[11] 4,377,861
[45] Mar. 22, 1983

[54] TIME DIVISION DEMULTIPLEXER WITH INDEPENDENT DATA DISTRIBUTION

[75] Inventor: Charles E. Huffman, Plano, Tex.

[73] Assignee: Rockwell International Corporation, El Segundo, Calif.

[21] Appl. No.: 206,922

[22] Filed: Nov. 14, 1980

[51] Int. Cl.³ .............................................. H04J 15/00
[52] U.S. Cl. ...................................... 370/112; 370/77
[58] Field of Search .................... 370/112, 113, 77, 95, 370/79, 59, 62

[56] References Cited

U.S. PATENT DOCUMENTS

| | | | |
|---|---|---|---|
| 3,959,594 | 5/1976 | Srivastava | 370/112 |
| 4,146,750 | 3/1979 | Spiesman | 370/112 |
| 4,270,204 | 5/1981 | Gordon | 370/112 |
| 4,285,052 | 8/1981 | Bobbitt | 370/112 |

*Primary Examiner*—Gerald L. Brigance
*Attorney, Agent, or Firm*—Michael E. Taken; Bruce C. Lutz; Howard R. Greenberg

[57] ABSTRACT

A time division demultiplexer is provided which reassigns clock positions to the various channels in a serial data stream such that different data bit positions may be assigned to a channel. This enables each channel to be independent. A single channel can access any data bit position in the serial data stream, and several or all the channels can access the same data bit position.

5 Claims, 4 Drawing Figures

TIME DIVISION DEMULTIPLEXER WITH INDEPENDENT DATA DISTRIBUTION

TECHNICAL FIELD

The invention relates to time division demultiplexers for distributing data, and more particularly to independent data distribution.

BACKGROUND

Time division multiplexers and demultiplexers are known in the art and are used to collect and distribute data, respectively. Receive equipment distributes data in a fixed manner once the equipment has been designed. The data distribution is sequential. Once a channel is allotted a bit or frame position in a data stream, it will receive that bit or frame and only that bit or frame.

The standard approach for independently distributing data involves storing the data in a random access memory and using a significant amount of logic to gate the data to the correct channels. This is a cumbersome method and in a system with a significant number of channels would be very expensive.

Summary

The present invention provides a time division demultiplexing system wherein data may be distributed independently to each channel and it may be altered for a different distribution pattern at any time.

A time division demultiplexer in its most basic concept provides timing signals for the demultiplex operations. Recognition of this fundamental principle is significant to the invention. Instead of assigning a specific clock position to each channel in order to locate a specific data bit, the present invention reassigns clock positions to the channels so that different data bit positions may be assigned to a channel. This allows each channel to be independent. Not only can a single channel access any data bit or frame position, but several or all the channels can access the same data bit or frame position.

The invention is particularly simple and efficient. Data distribution is accomplished in real time, without storing the data in a memory.

DESCRIPTION OF PRIOR ART

Figure 1:
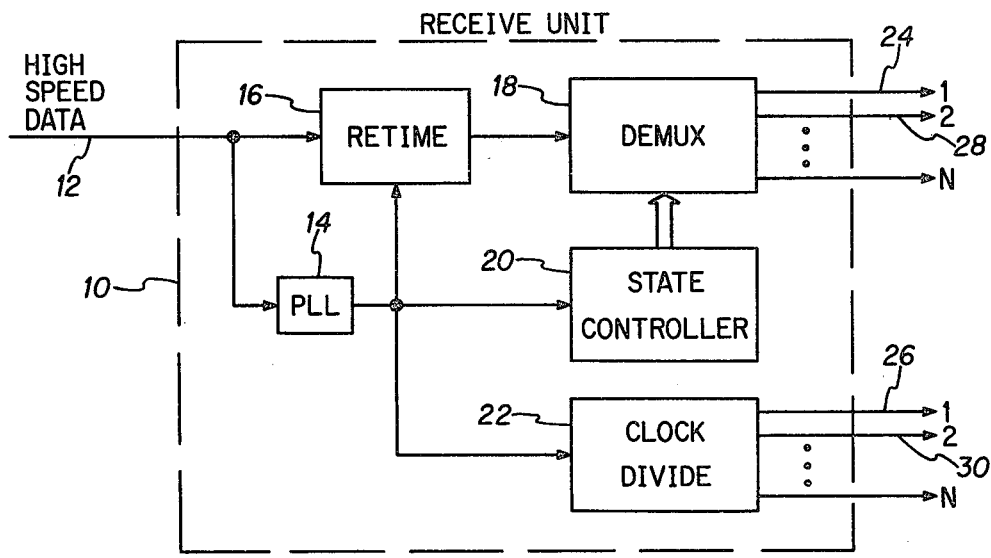
FIG. 1 is a schematic circuit diagram of a prior art demultiplexer receive unit.

FIG. 1 shows a known demultiplexer receive unit 10. High speed serial data is received from line 12. A clock recovery circuit 14, such as a phase-locked loop, extracts the clock signals from the high speed data. These clock signals are delivered to a retime circuit 16, such as a retime flip-flop, to retime or synchronize the high speed data to the recovered clock. The retimed high speed data is delivered to a demultiplexing unit 18 which outputs the plurality of channels from the high speed data stream at a lower rate. FIG. 1 shows N such data channel outputs.

The extracted clock signals from circuit 14 also drive a state controller 20 which provides framing configuration identification on a bus to demultiplex unit 18 for controlling and timing the demultiplexing operation by indicating which channel in the data stream is currently appearing at the input to circuit 18. The extracted clock signals from circuit 14 are also delivered to a clock divide circuit 22 which outputs N lower rate clock signals, one for each of the data channels output from circuit 18.

Each demultiplexed data channel signal and divided clock signal pair is dedicated and delivered to a single designated respective channel unit. For example, data signal 24 and clock signal 26 are delivered to channel unit 1, data channel signal 28 and clock signal 30 are delivered to channel unit 2, and so on. Once the sequence is designed into the system, it remains set. Independent or selective channel data distribution is provided by storing the channel data in a random access memory and using a significant amount of logic to gate the data to the desired channels.

DETAILED DESCRIPTION OF THE INVENTION

Figure 2:
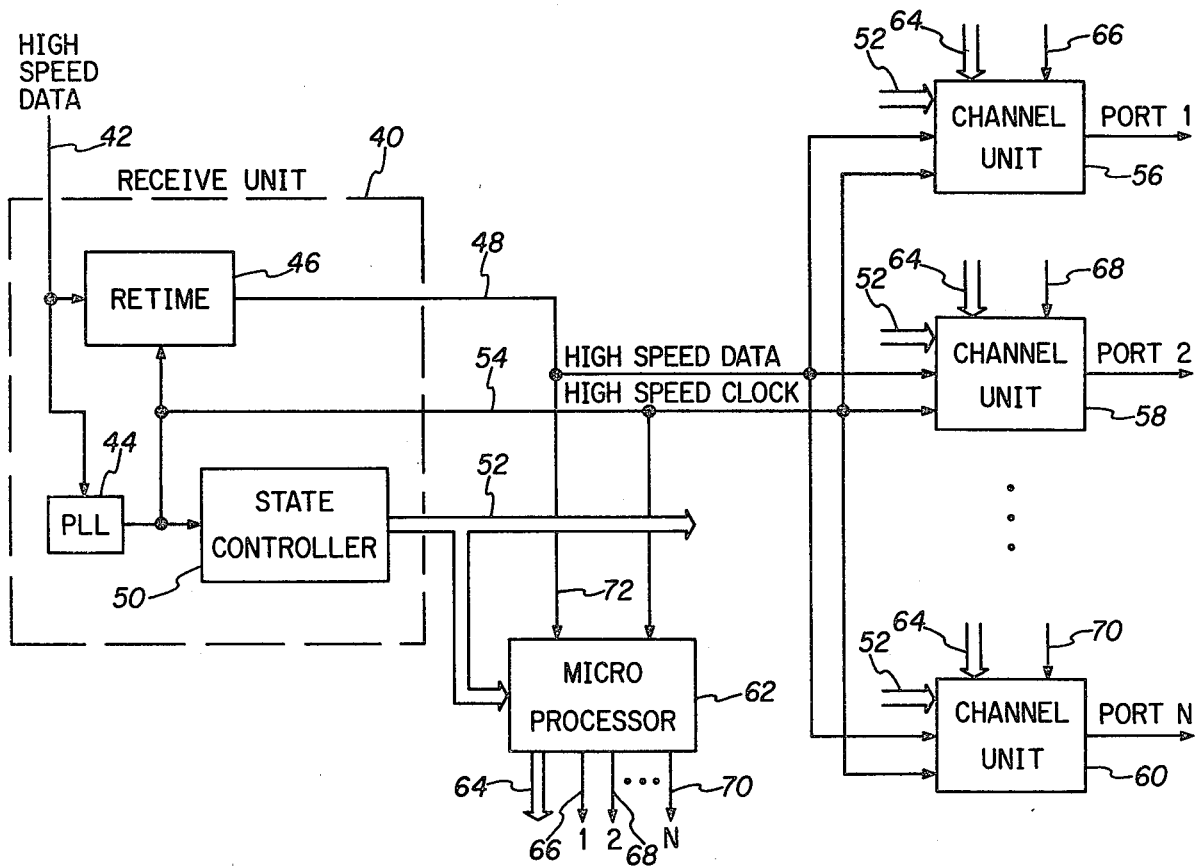
FIG. 2 is a schematic circuit diagram of a time division demultiplexer constructed in accordance with the invention.

FIG. 2 shows a demultiplexing system constructed in accordance with the invention providing simple and efficient selective and independent data distribution. Furthermore, the data distribution is accomplished in real time without resorting to intermediate storage memories.

In FIG. 2, receive unit 40 receives high speed serial data from line 42. Clock signals are extracted from the high speed serial data by a clock recovery circuit 44, such as a phase-locked loop. The extracted clock signals are delivered to a retime circuit 46, such as a retime flip-flop, which delivers the retimed or synchronized high speed data on output line 48. The extracted clock signals from circuit 44 are also delivered to a state controller 50 which outputs framing configuration identification on bus 52. The extracted clock signals from circuit 44 are also delivered on output high speed clock line 54.

The high speed data on line 48 and the high speed clock signals on line 54 are each delivered in common to a plurality of channel units 56, 58, and so on through the Nth channel unit 60. Each data channel frame or bit position on the serial high speed data line 48 is thus available to each of the channel units, i.e., channel 1 is available to each of the channel units simultaneously during a first time slot of the high speed data line 48, channel 2 is available to each of the channel units simultaneously during a second time slot of the high speed data line 48, and so on. Framing configuration identification bus 52 is also connected in common to each of the channel units such that identification of the channel currently appearing on high speed data line 48 is presented to each channel unit, i.e., each channel unit knows which data channel is currently presented thereto.

Framing configuration identification bus 52 is also connected to central microprocessor means 62 such that the latter also knows which channel is currently appearing on high speed data line 48. Microprocessor 62 is clocked by the high speed clock signals from line 54. The microprocessor has an output address bus 64 connected in common to all of the channel units for carrying selectable channel addresses thereto. The channel address presented by bus 64 may be held in the channel unit by a register or the like and is compared against the channel identified on bus 52, to be more fully described hereinafter. When the two channel identities on buses 64 and 52 are equal, a gate is activated which enables passage of the then current data channel frame or bit position on line 48 through that respective channel unit to its output port.

The microprocessor has a plurality of dedicated strobe lines 66, 68, and so on through the Nth strobe line 70, each connected to a respective one of the channel units as shown. The channel address on bus 64 is presented simultaneously to all the channel units. This address is strobed into those channel units which are enabled by their strobe lines. For example, if the address for channel 4 is on bus 64 and only strobe line 68 is high, then the channel 4 address will be entered into channel unit 58 but not into the other channel units.

Microprocessor 62 may be controlled by a user at the location of receive unit 40 and/or by a distant transmitter using one of the channels on line 42 as a command control channel. For this latter application, a data connection 72 from high speed data line 48 is provided to the microprocessor.

Figure 3:
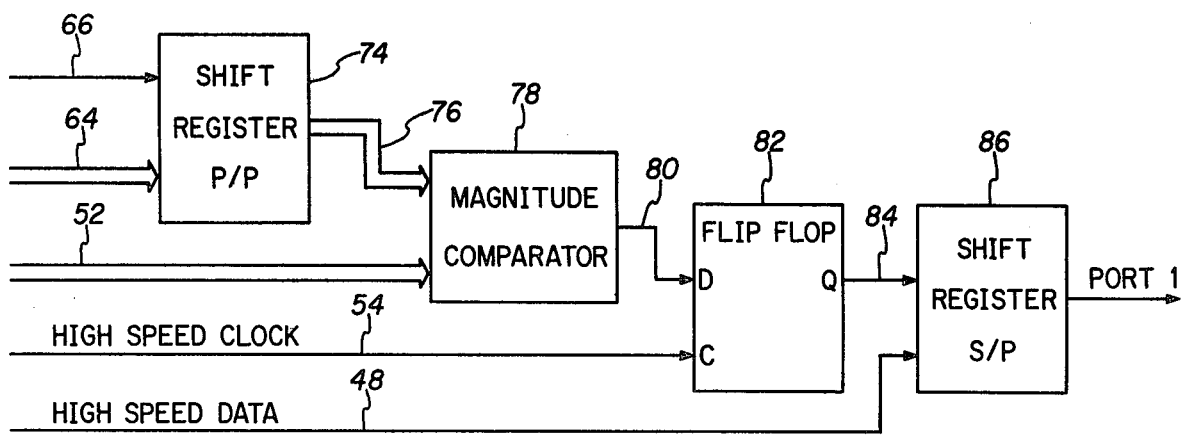
FIG. 3 is a schematic circuit diagram of a channel unit of FIG. 2.

FIG. 3 schematically illustrates channel unit 56 of FIG. 2. The remaining channel units are comparable. Strobe line 66 and address bus 64 are connected to a parallel in, parallel out shift register 74. The address on bus 64 is shifted through register 74 to output 76 when strobed by a high signal on line 66. Framing configuration identification bus 52 and bus 76 are connected to a magnitude comparator 78 which outputs a first gating signal on line 80 when the address codes on buses 52 and 76 are equal.

The gating signal on line 80 is delivered to a first gate 82, provided by a type D flip-flop. Line 80 is connected to the D input of flip-flop 82. High speed clock line 54 is connected to the C input of this flip-flop. The Q output of this flip-flop delivers a second gating signal on line 84 in response to the first gating signal on line 80 and synchronized to a high speed clock signal on line 54. A second gate, such as a serial in, parallel out shift register 86 receives the second gating signal on line 84 and the high speed data on line 48 for registering the then current high speed data frame or bit upon occurrence of the second gating signal on line 84.

Figure 4:
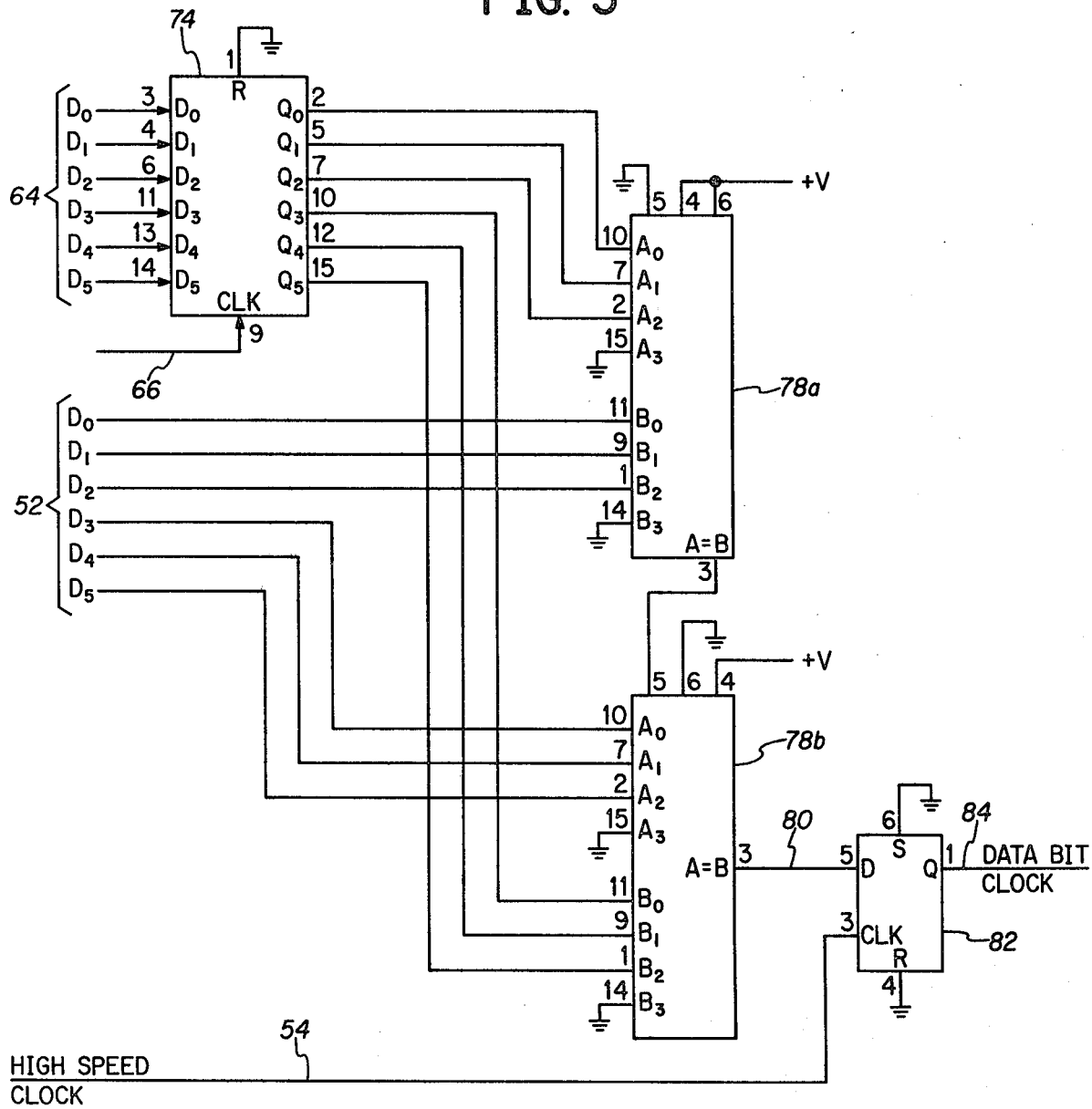
FIG. 4 is a more detailed circuit diagram of the channel unit of FIG. 3.

FIG. 4 shows the circuit of FIG. 3 in greater detail. Output address bus 64 from the microprocessor 62 carries 6 bits to shift register 74 such as a hex D flip-flop 4174B. The standard catalog port designations and the pin numerations for the components in FIG. 4 are shown for clarity. Strobe line 66 is connected to the clock input of register 74. 3 of the 6 output bits from register 74 are delivered to magnitude comparator 78a and the other 3 output bits from register 74 delivered to magnitude comparator 78b. These comparators are 4-bit 4585B magnitude comparators. The framing configuration identification bus 52 carries 6 bits, 3 bits to comparator 78a and 3 bits to comparator 78b. These 6 bit busing structures are amenable to a 64 channel serial multiplexed configuration.

A positive comparison in comparator 78a and 78b yields the first gating signal on line 80 to the first gate 82 which is a 4013B flip-flop. This flip-flop also receives the high speed clock line 54 whereby to generate the second gating signal on line 84 which is the data bit clock which enables passage of the then current data channel frame or bit on high speed line 48 through channel unit 56 to output port 1.

The invention thus affords a method of time division demultiplexing providing independent selective channel data distribution to a plurality of channel units each accessing any channel in real time. This method comprises the reassigning of clock positions relative to data bits for reassigning data bit positions relative to channels.

Variable channel distribution is provided by logic controlled selective gating means for reassigning clock positions to the channels such that any data frame or bit position may be assigned to any channel. A plurality of channel units are provided each having access to a common high speed serial data line. Independent gates are provided at each channel unit for selectively passing any channel therethrough. Central microprocessor means is operatively coupled to each of the gates for controlling the channel distribution pattern among the channel units and enabling user controlled alteration thereof. Each channel unit has frame address storage means, such as 74, loaded by the central microprocessor for determining which channel in the data stream is gated through that channel unit. Dedicated strobe connections are provided from the central microprocessor to each channel unit.

The central microprocessor receives the framing configuration identification of the data on line 48 via bus 52. The central microprocessor delivers selectively assigned clock positions via bus 64 to the channel units for controlling which channel is passed through which channel unit. The channel address on bus 64 is a clock position assignment and may be strobed into any or all of the channel units. Each channel unit outputs any channel in the data stream from line 48 independently of the other channel units.

It is recognized that various modifications are possible within the scope of the appended claims.

I claim:

1. Time division demultiplexer apparatus comprising, in combination:

high speed data line means for supplying frames of data bits;

clock recovery means, connected to said data line means, for extracting high speed clock signals from said frames of data bits;

state controller means for providing framing configuration identification signals;

a plurality of channel units, each connected for receiving said frames of data bits, high speed clock signals and said framing configuration identification signals; and microprocessor means connected to said clock recovery means, said state controller means, and said plurality of channel units for supplying to said channel units framing configuration address signals which dynamically assign clock positions to said channels whereby any channel can pass any data bit in a frame of data bits when the framing configuration address signal matches the framing configuration identification signal.

2. A time division demultiplexer comprising:

a receive unit for receiving a serial high speed data stream having a plurality of multiplexed channels in a predetermined framing sequence configuration, said receive unit including:

clock recovery means for extracting high speed clock signals from said data stream; and state controller means for providing framing configuration identification;

a plurality of channel units, each receiving said high speed data stream, said high speed clock signals and said framing configuration identification; and microprocessor means receiving said framing configuration identification and delivering dynamically assigned clock position's to said channel units for controlling which channel data bits are passed through which channel unit, each channel unit outputting any number of channels in said data stream independently of the other channel units.

3. The invention according to claim 2 wherein:

the first channel in said data stream is presented simultaneously to all said channel units during a first time slot, the second channel in said data stream is presented simultaneously to all said channel units during a second time slot, and so on for the remainder of said channels; and said framing configuration identification is delivered on a bus common to said channel units and to an input to said microprocessor means such that identification of the channel currently appearing in said data stream is presented to each of said channel units and to said microprocessor means.

4. The invention according to claim 3 wherein:

said microprocessor means has an output address bus connected in common to all of said channel units for carrying selectable channel addresses thereto;

said microprocessor means has a plurality of dedicated output strobe lines, each connected to a respective one of said channel units, such that the channel address from said microprocessor means is presented to each of said channel units and is strobed into a selected channel unit in accordance with a strobe signal on the strobe line for that channel unit;

each said channel unit comprises channel address storage means for storing the channel address strobed thereinto from said address bus from said microprocessor means;

each said channel unit comprises comparator means for comparing the channel address stored in said channel address storage means with the framing configuration identification on said first mentioned bus identifying the channel currently appearing in said data stream, said comparator means outputting a gating signal when said currently appearing channel matches said channel address; and each said channel unit comprises gate means responsive to said gating signal for passing said high speed data through that channel unit.

5. The invention according to claim 4 wherein said gate means comprises:

a first gate receiving said gating signal and receiving said high speed clock signals, and outputting a second gating signal in response to said first mentioned gating signal and synchronized to a high speed clock signal; and a second gate receiving said second gating signal and said high speed data for registering said high speed data upon occurrence of said second gating signal.

* * * * *